US009077086B2

(12) United States Patent
Hsieh et al.

(10) Patent No.: US 9,077,086 B2
(45) Date of Patent: Jul. 7, 2015

(54) PORTABLE COMMUNICATION APPARATUS

(71) Applicant: Cho-Yi Lin, New Taipei (TW)

(72) Inventors: Shih-Wei Hsieh, Taipei (TW); Cho-Yi Lin, New Taipei (TW)

(73) Assignee: Cho-Yi Lin, New Taipei (TW)

( * ) Notice: Subject to any disclaimer, the term of this patent is extended or adjusted under 35 U.S.C. 154(b) by 290 days.

(21) Appl. No.: 13/668,324

(22) Filed: Nov. 5, 2012

(65) Prior Publication Data
US 2013/0314294 A1   Nov. 28, 2013

(30) Foreign Application Priority Data

May 23, 2012   (TW) ............................... 101118314 A

(51) Int. Cl.
| H01Q 1/50 | (2006.01) |
| H01Q 21/30 | (2006.01) |
| H04B 1/04 | (2006.01) |
| H04B 1/18 | (2006.01) |
| H01Q 5/335 | (2015.01) |

(52) U.S. Cl.
CPC ............ H01Q 21/30 (2013.01); H04B 1/0458 (2013.01); H04B 1/18 (2013.01); H01Q 5/335 (2015.01)

(58) Field of Classification Search
USPC .................................. 343/702, 852, 853, 860
See application file for complete search history.

(56) References Cited

U.S. PATENT DOCUMENTS

| 7,084,831 | B2 * | 8/2006 | Takagi et al. ................. 343/860 |
| 2010/0013721 | A1 * | 1/2010 | Kojima .......................... 343/702 |
| 2013/0093634 | A1 * | 4/2013 | Rowson et al. ............... 343/745 |
| 2013/0328742 | A1 * | 12/2013 | Hirobe et al. ................. 343/853 |
| 2014/0118214 | A1 * | 5/2014 | Tanaka .......................... 343/852 |

FOREIGN PATENT DOCUMENTS

| CN | 1661855 A | 8/2005 |
| CN | 1682405 A | 10/2005 |
| CN | 101707281 A | 5/2010 |
| CN | 202127084 U | 1/2012 |
| CN | 102341954 A | 2/2012 |
| JP | 2008167098 A | 7/2008 |
| TW | 201108503 A1 | 3/2011 |

OTHER PUBLICATIONS

First Office Action and Search Report (English translation of Search Report enclosed); Chinese Patent Application No. 201210241297.1; Dec. 2, 2014; State Intellectual Property Office of the People's Republic of China.
First Office Action; Taiwanese Patent Application No. 101118314; dated Feb. 25, 2015; Taiwan Intellectual Property Office; Taipei, Taiwan.

\* cited by examiner

*Primary Examiner* — Tan Ho
(74) *Attorney, Agent, or Firm* — Stevens & Showalter LLP

(57) ABSTRACT

A portable communication apparatus includes a first antenna radiator, a second antenna radiator, a first feeding point, a second feeding point, and a matching circuit. The first antenna radiator is used for radiating a high-frequency band signal. The second antenna radiator is used for radiating a low-frequency band signal. The first feeding point is coupled to the first antenna radiator and is utilized for processing feed-in or feed-out of the signal of first antenna radiator. The second feeding point is coupled to the second antenna radiator and is utilized for processing feed-in or feed-out of the signal of second antenna radiator. The first feeding point is separate from the second feeding point. The matching circuit is coupled to the first and second feeding points, and used for impedance matching with the first antenna radiator and the second antenna radiator.

18 Claims, 8 Drawing Sheets

PORTABLE COMMUNICATION APPARATUS

BACKGROUND OF THE INVENTION

1. Field of the Invention

The present invention relates to a scheme of a portable communication apparatus, and more particularly to a portable communication apparatus which uses a separate antenna design.

2. Description of the Prior Art

In a traditional communication device, different antennas respectively used for high-frequency and low-frequency band signals are installed on the same surface or at a same side, so as to save surface area of the communication device. The correlation coefficient between the antennas will become very high, however, when the antennas are installed on the same surface. This higher correlation coefficient causes the whole circuit size of antennas to become very large. A very large circuit size for antenna implementation will cause more restrictions when implementing other appliances of a traditional portable communication apparatus. In addition, the higher correlation coefficient also results in poor communication quality.

SUMMARY OF THE INVENTION

Therefore, one of the objectives of the present invention is to provide a portable communication apparatus which can solve the above-mentioned problems.

According to an embodiment of the present invention, a portable communication apparatus is disclosed. The portable communication apparatus comprises a first antenna radiator, a second antenna radiator, a first feeding point, a second feeding point, and a matching circuit. The first antenna radiator is utilized for radiating a high-frequency band signal, and the second antenna radiator is utilized for radiating a low-frequency band signal. The first feeding point is coupled to the first antenna radiator and utilized for processing feed-in or feed-out of a signal of the first antenna radiator. The second feeding point is coupled to the second antenna radiator and utilized for processing feed-in or feed-out of a signal of the second antenna radiator. The second feeding point is separate to the first feeding point, and the matching circuit is coupled to the first feeding point and the second feeding point, and is utilized for matching with an impedance of the first antenna radiator and an impedance of the second antenna radiator, respectively.

According to the above-described embodiment, the advantages of better space utilization for circuit design, higher design reliability for the portable communication apparatus, and improved communication quality can be easily achieved.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
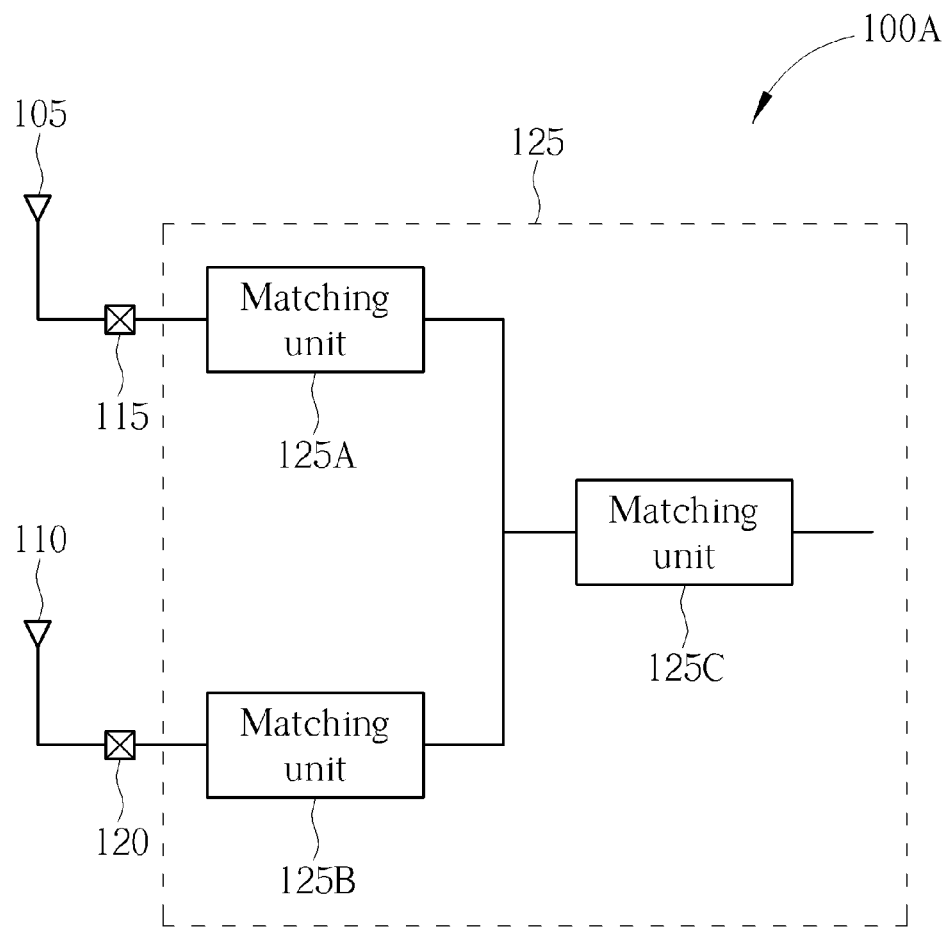
FIG. 1A is a block diagram of a portable communication apparatus according to a first embodiment of the present invention.

Please refer to FIG. 1A, which is a block diagram of a portable communication apparatus 100A according to a first embodiment of the present invention. As shown in FIG. 1A, the portable communication apparatus 100A comprises a first antenna radiator 105, a second antenna radiator 110, a first feeding point 115, a second feeding point 120, and a matching circuit 125. The first antenna radiator 105 is utilized for radiating/emitting or receiving a high-frequency band signal and the second antenna radiator 110 is utilized for radiating/emitting or receiving a low-frequency band signal. The first feeding point 115 is coupled to the first antenna radiator 105 and utilized for processing feed-in or feed-out of a signal of the first antenna radiator 105. In other words, the first feeding point 115 is used for processing the feed-in and feed-out of the high-frequency band signal. When the portable communication apparatus 100A receives the high-frequency band signal, the first feeding point 115 is arranged to process feed-in of the high-frequency band signal. When the portable communication apparatus 100A emits the high-frequency band signal, the first feeding point 115 is arranged to process feed-out of the high-frequency band signal. Similarly, the second feeding point 120 is coupled to the second antenna radiator 110 and utilized for processing feed-in or feed-out of a signal of the second antenna radiator 110. In other words, the second feeding point 120 is utilized for processing the feed-in or feed-out of the low-frequency band signal. When the portable communication apparatus 100A receives the low-frequency band signal, the second feeding point 120 is arranged to process feed-in of the low-frequency band signal. When the portable communication apparatus 100A emits the low-frequency band signal, the second feeding point 120 is utilized for processing feed-out of the low-frequency band signal.

The first antenna radiator 105 is directly coupled to (i.e. electrically connected to) the first feeding point 115. The second antenna radiator 110 is directly coupled to (i.e. electrically connected to) the second feeding point 120. In addition, the matching circuit 125 is coupled to the first feeding point 115 and the second feeding point 120, and is utilized for respectively matching with the impedance of the first antenna radiator 105 and the impedance of the second antenna radiator 110. The matching circuit 125 comprises a plurality of matching units 125A-125C. The matching unit 125A is coupled between the first feeding point 115 and the matching unit 125C, and is used with the matching unit 125C to match with the first antenna radiator 105 for providing a better impedance matching for processing the high-frequency band signal. The matching unit 125B is coupled between the second feeding point 120 and the matching unit 125C, and is used with the matching unit 125C to match with the second antenna radiator 110 for providing a better impedance matching for processing the low-frequency band signal. In other words, the matching units 125A and 125C are used for matching with the impedance of the first antenna radiator so as to appropriately transmit or receive the high-frequency band signal. The matching units 125B and 125C are used for matching with the impedance of the second antenna radiator so as to appropriately transmit or receive the low-frequency band signal. In this embodiment, the matching units 125A-125C included within the matching circuit 125 are all implemented on a circuit board of the portable communication apparatus 100A. Both the first antenna radiator 105 and second antenna radiator 110 are used for forming the antenna body of the portable communication apparatus 100A. Please note the above is not meant to be a limitation of the present invention.

It should be noted that, in this embodiment, the second feeding point 120 is separate to the first feeding point 115, and is merely electrically connected to the first feeding point 115 on the circuit board, i.e. the first antenna radiator 105 does not physically touch the second antenna radiator 110. The first antenna radiator 105 is not directly connected to the second antenna radiator 110. In other words, the first antenna radiator 105 and the second antenna radiator 110 are separate antenna branches for respectively processing the high-frequency band signal and low-frequency band signal. The circuit branch employed for the feed-in and feed-out of the high-frequency band signal does not overlap with the branch employed for the feed-in and feed-out of the low-frequency band signal. As a result, the correlation coefficient between the first antenna radiator 105 and second antenna radiator 110 is very small, and the high-frequency band signal and low-frequency band signal are not affected by each other when they are fed out or fed in. Compared to the traditional antenna radiator design which processes the feed-in and feed-out of high-frequency and low-frequency band signals by using the same feeding point, since the correlation coefficient between the first antenna radiator 105 and second antenna radiator 110 is very small, the whole circuit size can be decreased when the first antenna radiator 105 and second antenna radiator 110 are implemented on the same surface or at a same side of the portable communication apparatus 100A. In the traditional antenna radiator design, space utilization of arranging signal paths is poor since the same feeding point is used for processing the feed-in and feed-out of the high-frequency and low-frequency band signals. In the first embodiment of the present invention, however, space utilization of arranging signal paths is much better since two separate feeding points are used for respectively processing the feed-in and feed-out of the high-frequency and low-frequency band signals.

Fewer circuit areas are employed by the separate antennas of the first antenna radiator 105 and second antenna radiator 110, freeing up a larger area on the same surface of the portable communication apparatus 100A which can be used for other appliances. For instance, a speaker can be installed on the available area of the same surface. In the traditional communication device, a larger proportion of the same surface of the traditional communication device is occupied by the antenna circuit since the size of the antenna circuit is larger, meaning the ease of implementing other appliances is restricted.

In addition, the separate antenna design for high-frequency and low-frequency band signals can improve the efficiency of the whole antenna design and the quality of signal communications. In the preferred embodiment of the present invention, both the first antenna radiator 105 and second antenna radiator 110 are installed or configured on the same surface or at the same side. It should be noted, however, that this preferred embodiment is not meant to be a limitation of the present invention. In other embodiments, the first antenna radiator 105 and second antenna radiator 110 may be installed or configured on different surfaces or at different sides, respectively. In addition, the first antenna radiator 105 is electrically connected to the first feeding point 115 via an indirect connection and is not directly coupled to the first feeding point 115. The second antenna radiator 110 is electrically connected to the second feeding point 120 via an indirect connection and is not directly coupled to the second feeding point 120. All these modifications fall within the scope of the present invention.

Figure 1B:
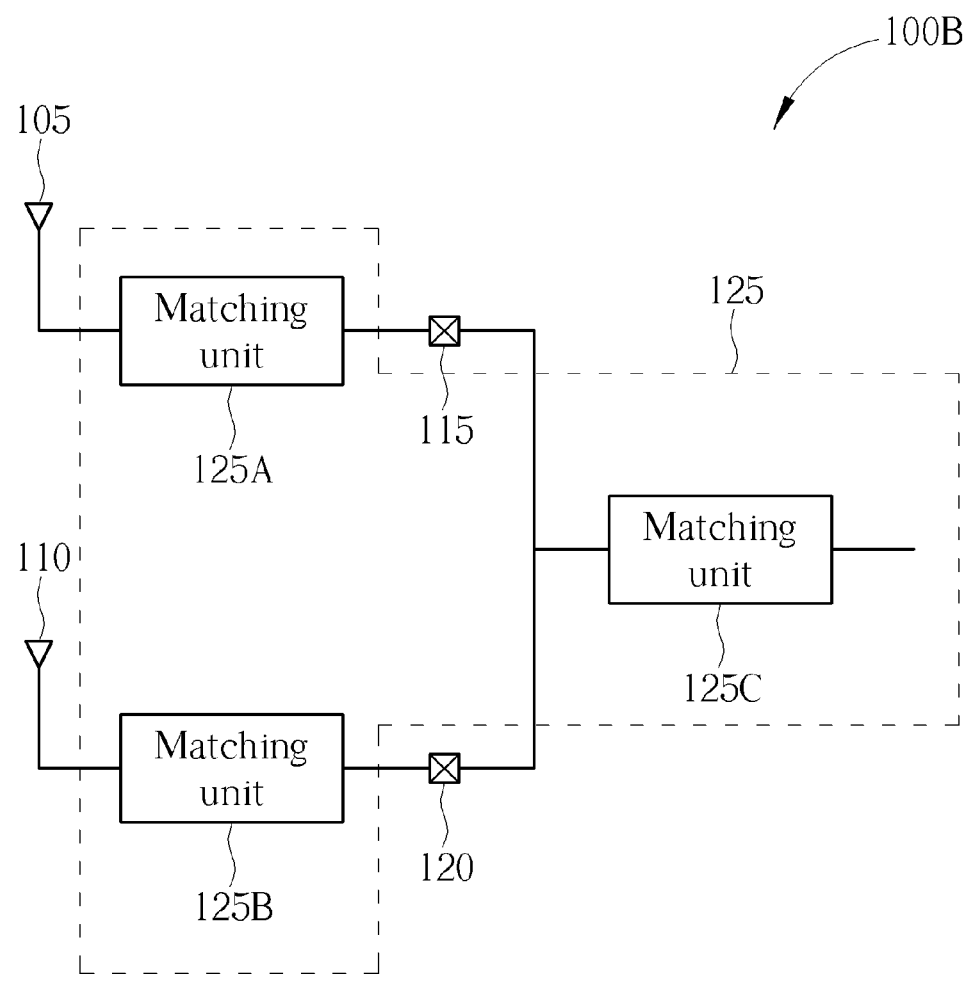
FIG. 1B is a block diagram of a portable communication apparatus according to a second embodiment of the present invention.

In another embodiment of the present invention, in practice, a portion of the matching circuit can be included within the antenna body. For example, the matching unit 125A shown in FIG. 1A is not necessarily installed on a circuit board; instead, the matching unit 125A may be used with the first antenna radiator 105 to form the antenna body used for receiving or emitting the high-frequency band signal. Similarly, the matching unit 125B as shown in FIG. 1A is also not necessarily installed on the circuit board; instead, the matching unit 125B may be used with the second antenna radiator 110 to form the antenna body used for receiving or emitting the low-frequency band signal. The matching units 125A and 125C also form a set of effective matching circuits to be matched with the impedance of the first antenna radiator 105 that is used for processing the high-frequency band signal. The matching units 125B and 125C also form a set of effective matching circuits to be matched with the impedance of the second antenna radiator 110 that is used for processing the low-frequency band signal. Please refer to FIG. 1B, which is a diagram of a portable communication apparatus 100B according to a second embodiment of the present invention. As shown in FIG. 1B, the matching unit 125A is coupled between the first antenna radiator 105 and first feeding point 115, and is used with the matching unit 125C included within the matching circuit 125 to form a set of circuit networks to be matched with the impedance of the first antenna radiator 105. The matching unit 125B is coupled between the second antenna radiator 110 and second feeding point 120, and is used with the matching unit 125C included within the matching circuit 125 to form a set of circuit networks to be matched with the impedance of the second antenna radiator 110. The matching unit 125A and first antenna radiator 105 can be regarded as a whole antenna body for receiving or emitting the high-frequency band signal, and the matching unit 125B and second antenna radiator 110 can be regarded as a whole antenna body for receiving or emitting the low-frequency band signal. It should be noted that the matching unit 125C is installed on the circuit board in practice, and the first feeding point 115 and second feeding point 120 are separate and merely connected via the circuit board. This kind of antenna design can also be regarded as a separate antenna design.

Figure 2A:
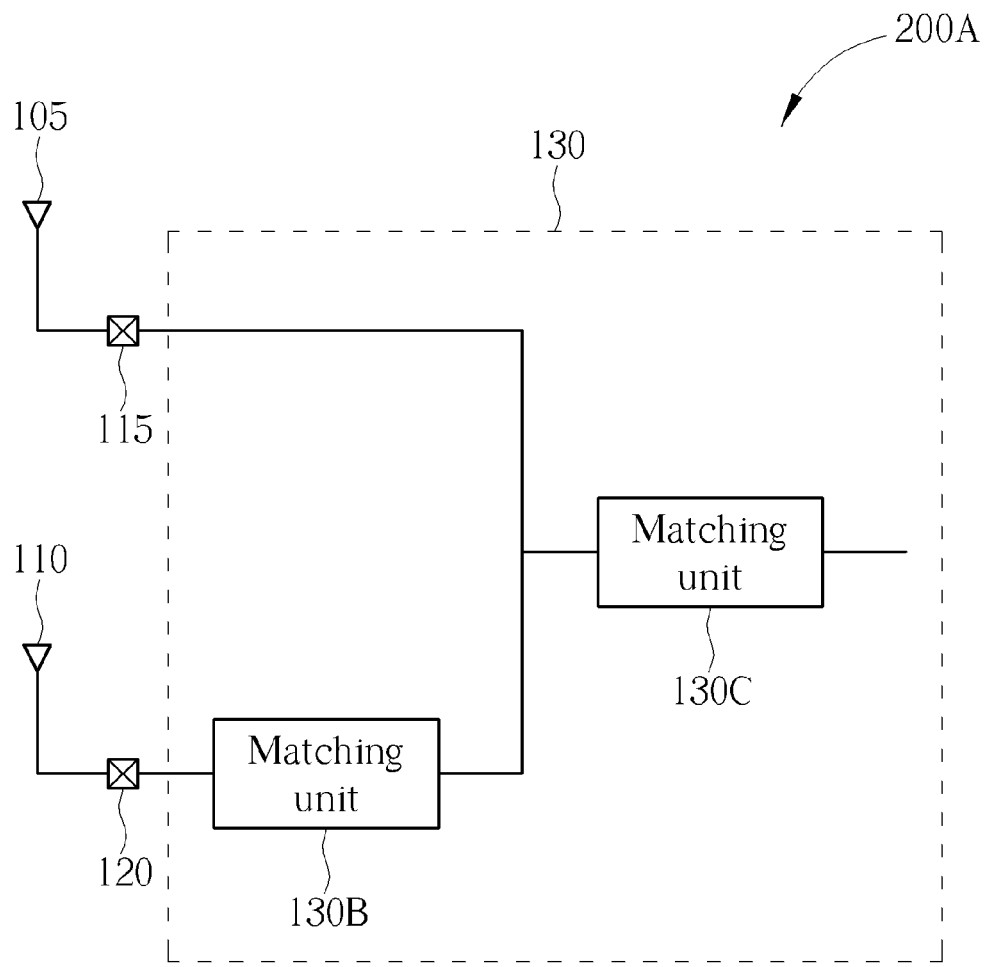
FIG. 2A is a block diagram of a portable communication apparatus according to a third embodiment of the present invention.
Figure 2B:
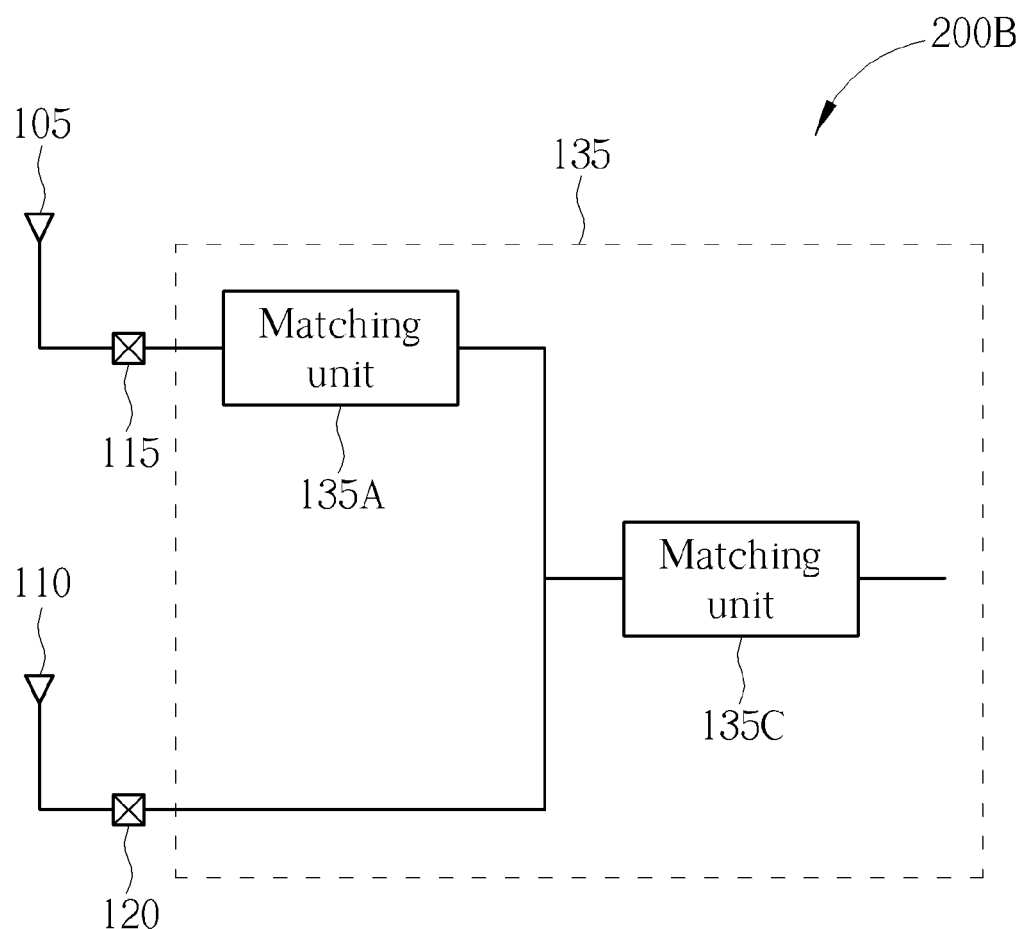
FIG. 2B is a block diagram of a portable communication apparatus according to a fourth embodiment of the present invention.

In other embodiments of the present invention, when determining the actual impedance of the matching network, a set of effective matching circuits to be matched with the impedance of the high-frequency antenna can be configured or designed first, and then a set of effective matching circuits to be matched with the impedance of the low-frequency antenna is configured or designed. Alternatively, the set of effective matching circuits to be matched with the impedance of the low-frequency antenna can be configured or designed at first, and then the set of effective matching circuits to be matched with the impedance of the high-frequency antenna is configured or designed. Please refer to FIG. 2A in conjunction with FIG. 2B. FIG. 2A is a diagram of the portable communication apparatus 200A according to a third embodiment of the present invention. FIG. 2B is a diagram of the portable communication apparatus 200B according to a fourth embodiment of the present invention. As shown in FIG. 2A, the portable communication apparatus 200A comprises the first antenna radiator 105, the second antenna radiator 110, the first feeding point 115, the second feeding point 120, and a matching circuit 130. The matching circuit 130 includes matching units 130B and 130C. The first feeding point 115 is directly coupled to the matching units 130B and 130C. The first antenna radiator 105 is directly coupled to (i.e. electrically connected to) the first feeding point 115. In the embodiment of FIG. 2A, the effective matching circuit for processing the high-frequency band signal is designed and configured at first, and then the effective matching circuit for processing the low-frequency band signal is designed and configured. Specifically, in this embodiment, the matching unit 130C is used as the effective matching circuit for processing the high-frequency band signal, and the first feeding point 115 is directly coupled to the matching unit 130C. The matching unit 130C can provide effective impedance for processing the high-frequency band signal without being used with other matching unit (s). After the impedance provided by the matching unit 130C is determined, the effective matching circuit for processing the low-frequency band signal is designed and can be determined. In this embodiment, the matching units 130B and 130C are connected in series to provide effective impedance for processing the low-frequency band signal.

As shown in the embodiment of FIG. 2B, the portable communication apparatus 200B comprises the first antenna radiator 105, the second antenna radiator 110, the first feeding point 115, the second feeding point 120, and a matching circuit 135. The matching circuit 135 comprises matching units 135A and 135C. The second feeding point 120 is directly coupled to the matching units 135A and 135C, and the second antenna radiator 110 is directly coupled (electrically connected) to the second feeding point 120. In the embodiment of FIG. 2B, the effective matching circuit for processing the low-frequency band signal is designed and configured at first, and then the effective matching circuit for processing the high-frequency band signal is designed and configured. Specifically, in this embodiment, the matching unit 135C is used as the effective matching circuit for processing the low-frequency band signal, and the second feeding point 120 is directly coupled to the matching unit 135C. The matching unit 135C can provide effective impedance for processing the low-frequency band signal without being used with other matching unit(s). After the impedance provided by the matching unit 135C is determined, the effective matching circuit for processing the high-frequency band signal is designed and can be determined. In this embodiment, the matching units 135A and 135C are connected in series to provide effective impedance for processing the high-frequency band signal.

In another embodiment, the matching unit 130B shown in FIG. 2A and the matching unit 135A shown in FIG. 2B may not be implemented on the circuit board. In this situation, the matching units 130B and 135A are respectively used with corresponding antenna radiators to form corresponding antenna bodies for respectively processing the low-frequency band signal and the high-frequency band signal. All these modifications fall within the scope of the present invention. In addition, the separate antenna design for high-frequency and low-frequency band signals can be applied to a portable communication apparatus for receiving and emitting at least three different frequency band signals. The separate antenna design for processing high-frequency and low-frequency band signals described in the above-mentioned embodiments is not meant to be a limitation of the present invention.

Figure 3:
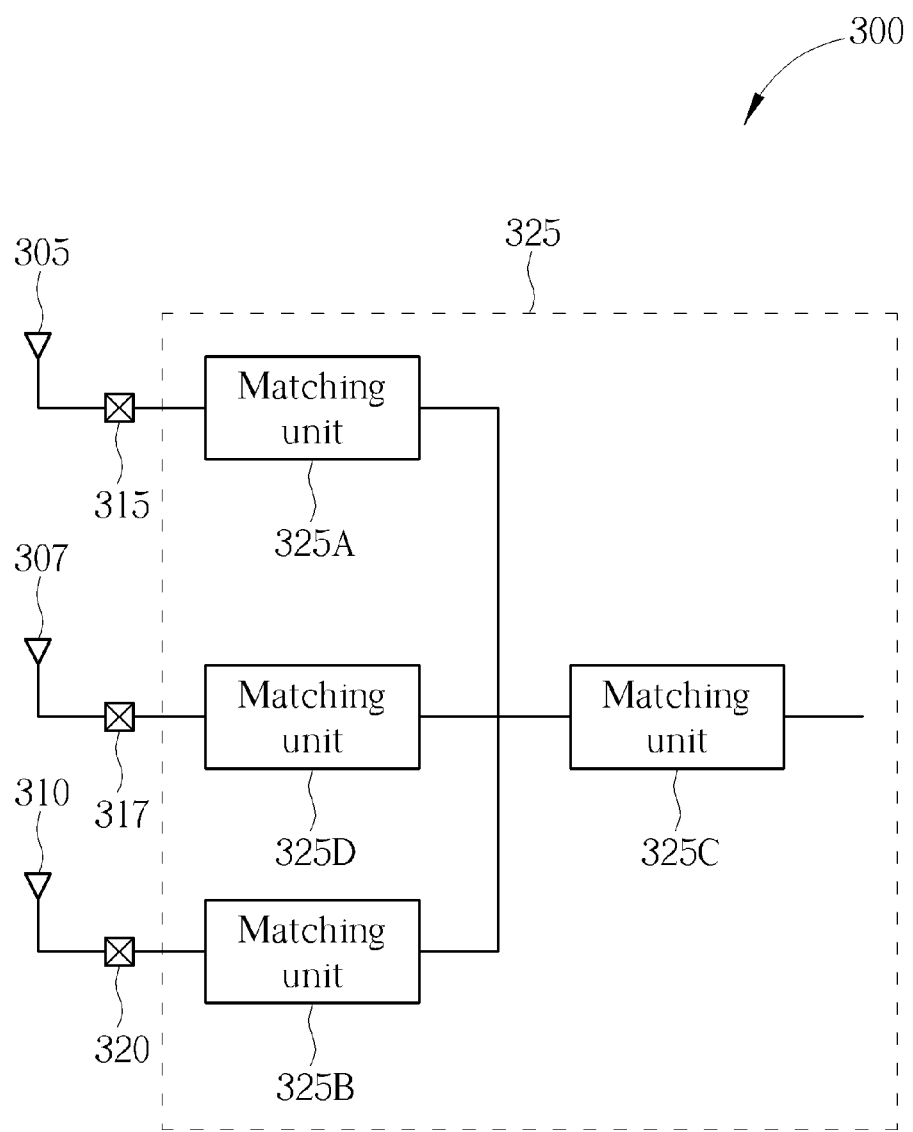
FIG. 3 is a block diagram of a portable communication apparatus according to a fifth embodiment of the present invention.
Figure 4:
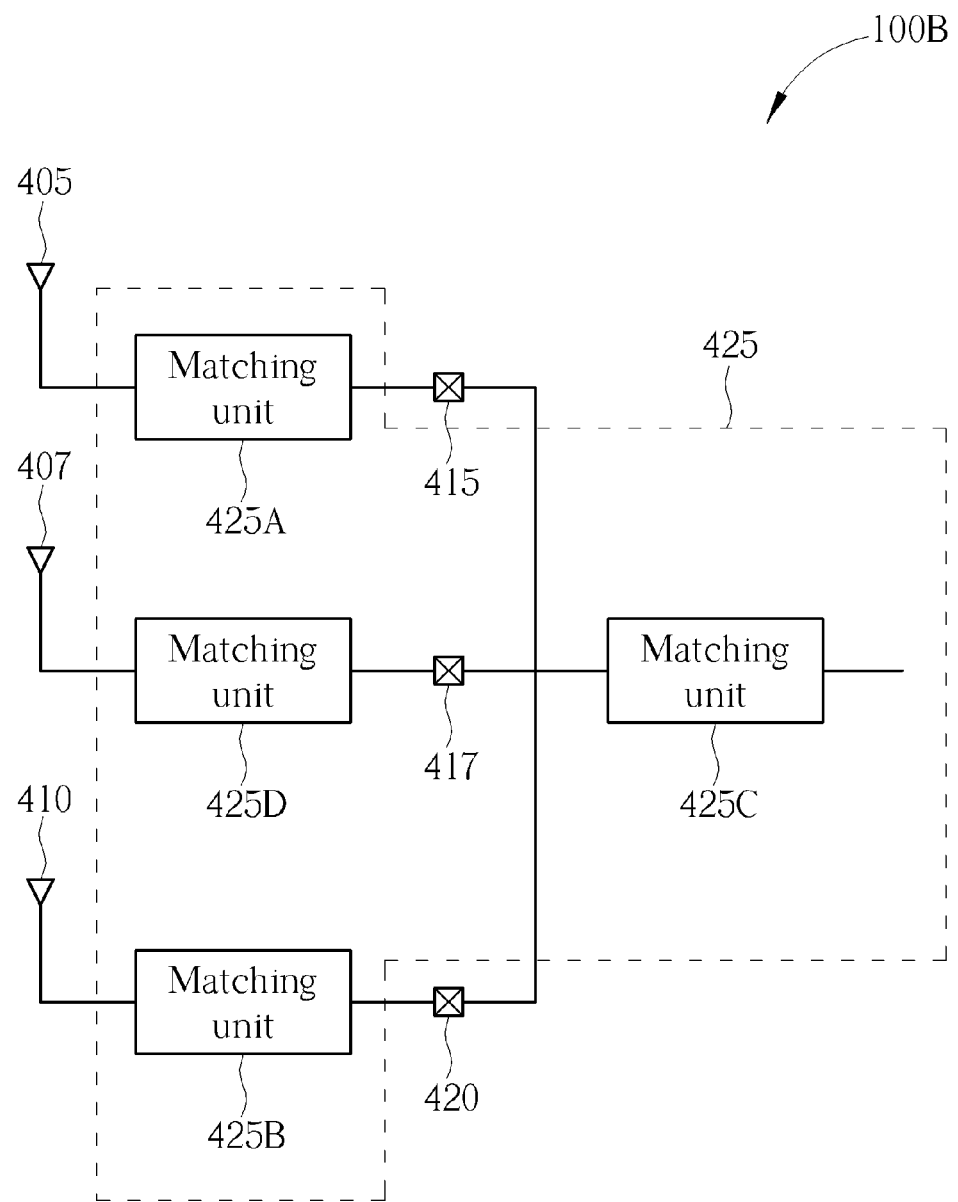
FIG. 4 is a block diagram of a portable communication apparatus according to a sixth embodiment of the present invention.
Figure 5:
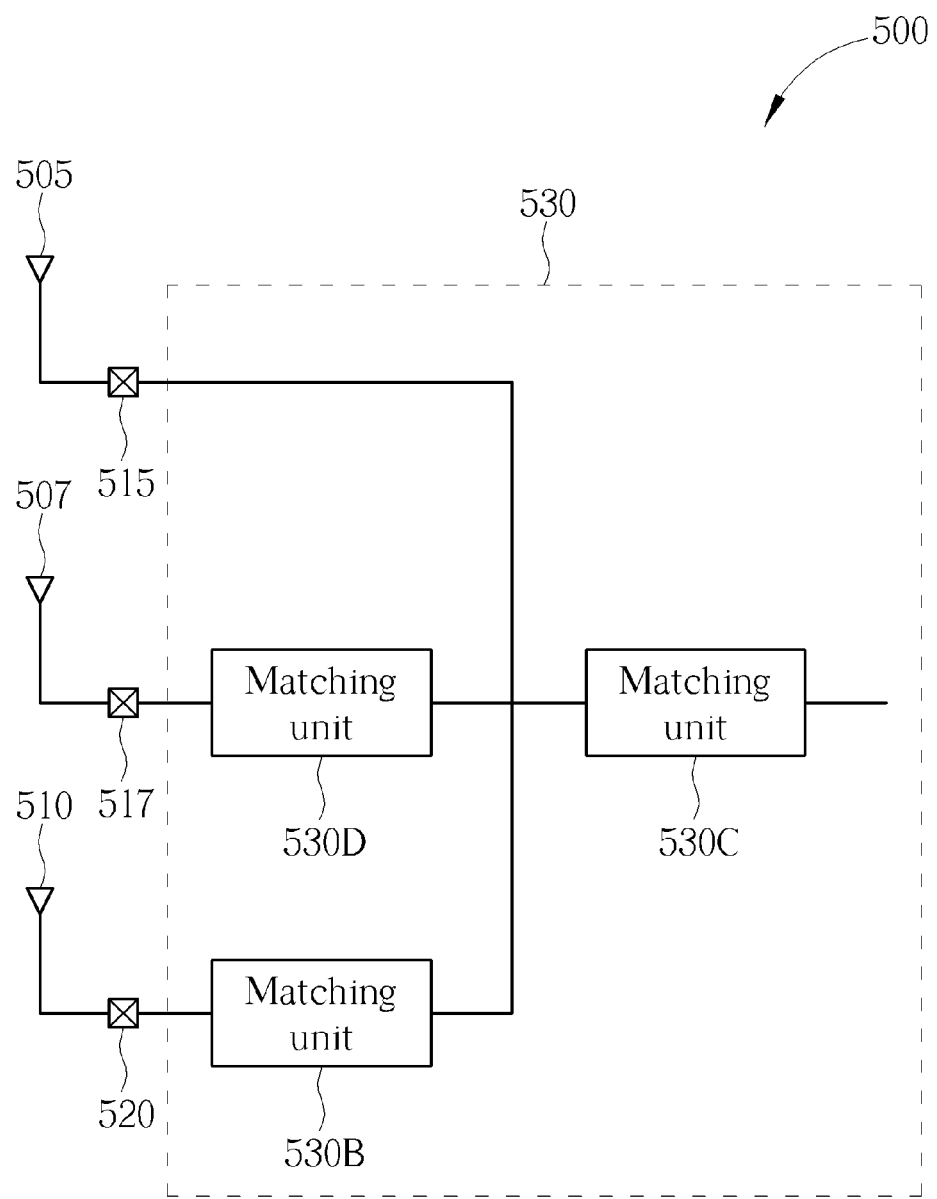
FIG. 5 is a block diagram of a portable communication apparatus according to a seventh embodiment of the present invention.
Figure 6:
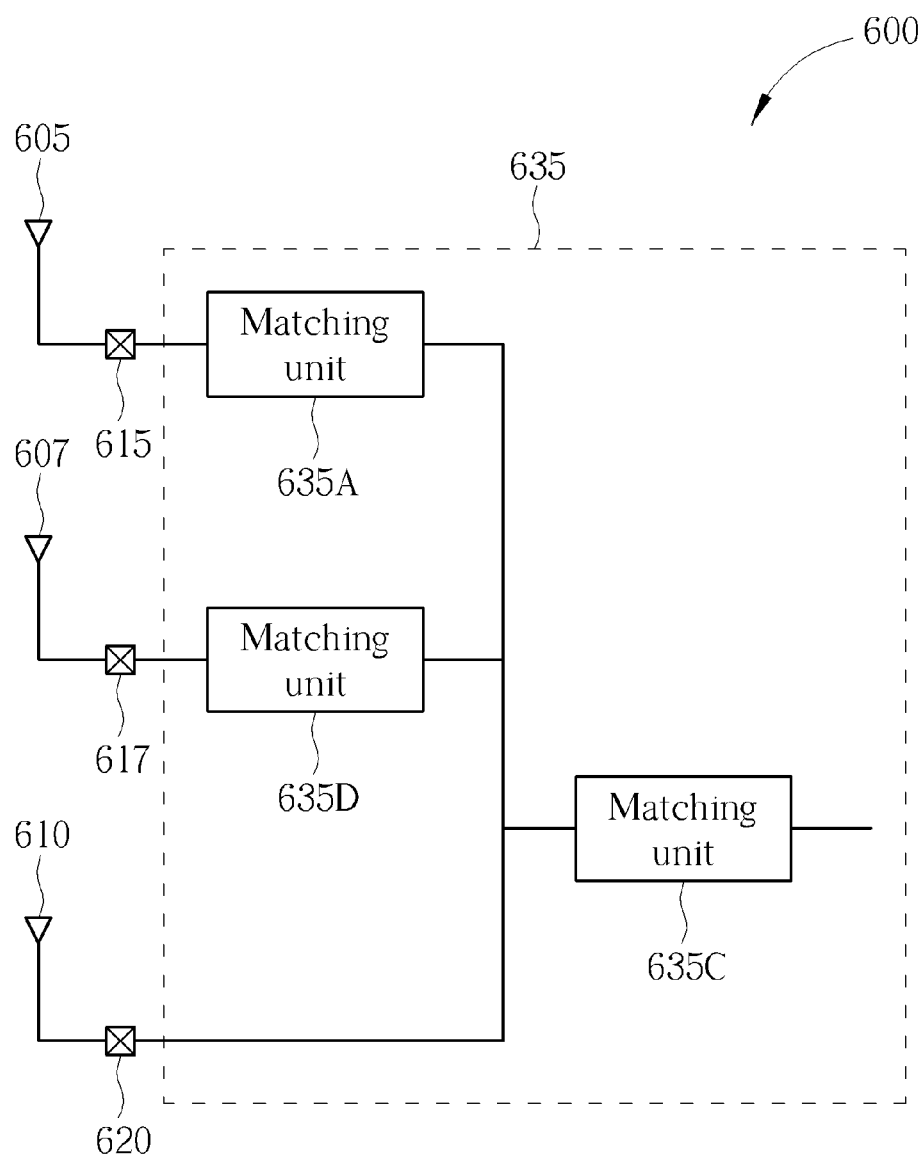
FIG. 6 is a block diagram of a portable communication apparatus according to an eighth embodiment of the present invention.

The separate antenna design can also be applied to a portable communication apparatus including more than two antenna radiators. For example, the separate antenna design can also be applied to a portable communication apparatus including three or more antenna radiators. Please refer to FIG. 3-FIG. 6. FIG. 3-FIG. 6 are block diagrams of different portable communication apparatuses including three antenna radiators according to different embodiments of the present invention. As shown in FIG. 3, the portable communication apparatus 300 comprises a first antenna radiator 305, a second antenna radiator 310, at least a third antenna radiator 307, a first feeding point 315, a second feeding point 320, at least a third feeding point 317, and a matching circuit 325. The matching circuit 325 includes matching units 325A-325D, and the matching units 325A-325D are connected according to the structure shown in FIG. 3. It should be noted that the operations and functions of the first antenna radiator 305, second antenna radiator 310, first feeding point 315, and second feeding point 320 are identical to those of the first antenna radiator 105, second antenna radiator 110, first feeding point 115, and second feeding point 120 as shown in FIG. 1. Further description is not provided here for brevity. In addition, the third antenna radiator 307 is utilized for radiating at least a specific band signal which has a band located between the band of a high-frequency band signal and the band of a low-frequency band signal. The third feeding point 317 is coupled to the third antenna radiator 307 and utilized for processing feed-in and feed-out of the signal of third antenna radiator 307. The matching circuit 325 is respectively matched with impedances of the first antenna radiator 305, second antenna radiator 310, and the at least one third antenna radiator 307 by using the matching units 325A-325D. The first antenna radiator 305, second antenna radiator 310, and the third antenna radiator 307 can be installed on the same surface or on different surfaces. In addition, the circuitry structures of the portable communication apparatuses 400, 500, and 600 are modifications of the portable communication apparatus 300 as shown in FIG. 3. The operations and functions of the portable communication apparatuses 400, 500, and 600 are similar to those of the portable communication apparatus 300. Further description is not provided for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A portable communication apparatus, comprising:
a first antenna radiator, for radiating a high-frequency band signal;
a second antenna radiator, for radiating a low-frequency band signal;
a first feeding point, coupled to the first antenna radiator, for processing feed-in or feed-out of the signal of the first antenna radiator;
a second feeding point, coupled to the second antenna radiator, for processing feed-in or feed-out of the signal of the second antenna radiator, the first feeding point being separate from the second feeding point;

a matching circuit, coupled to the first and second feeding points, for impedance matching with the first antenna radiator and the second antenna radiator respectively;
a first matching unit, coupled between the first antenna radiator and the first feeding point, being used with a third matching unit included in the matching circuit to match an impedance of the first antenna radiator for processing the high-frequency band signal; and
a second matching unit, coupled between the second antenna radiator and the second feeding point, being used with the third matching unit to match an impedance of the second antenna radiator for processing the low-frequency band signal;
wherein the third matching unit is installed on a circuit board.

2. The portable communication apparatus of claim 1, wherein the first antenna radiator does not physically touch the second antenna radiator.

3. The portable communication apparatus of claim 1, wherein the first antenna radiator and the second antenna radiator are installed on a same surface.

4. The portable communication apparatus of claim 1, wherein the first antenna radiator and the second antenna radiator are installed on different surfaces.

5. The portable communication apparatus of claim 1, wherein the first antenna radiator is directly coupled to the first feeding point.

6. The portable communication apparatus of claim 1, wherein the second antenna radiator is directly coupled to the second feeding point.

7. A portable communication apparatus, comprising:
a first antenna radiator, for radiating a high-frequency band signal;
a second antenna radiator, for radiating a low-frequency band signal;
a first feeding point, coupled to the first antenna radiator, for processing feed-in or feed-out of the signal of the first antenna radiator;
a second feeding point, coupled to the second antenna radiator, for processing feed-in or feed-out of the signal of the second antenna radiator, the first feeding point being separate from the second feeding point; and
a matching circuit, coupled to the first and second feeding points, for impedance matching with the first antenna radiator and the second antenna radiator respectively, wherein the matching circuit comprises:
a first matching unit, coupled between the first feeding point and a third matching unit, being used with the third matching unit to match an impedance of the first antenna radiator for processing the high-frequency band signal;
a second matching unit, coupled between the second feeding point and the third matching unit, being used with the third matching unit to match an impedance of the second antenna radiator for processing the low-frequency band signal; and
the third matching unit, coupled to the first and second matching units;
wherein the first, second, and third matching units are installed on a circuit board.

8. The portable communication apparatus of claim 7, wherein the first antenna radiator does not physically touch the second antenna radiator.

9. The portable communication apparatus of claim 7, wherein the first antenna radiator and the second antenna radiator are installed on a same surface.

10. The portable communication apparatus of claim 7, wherein the first antenna radiator and the second antenna radiator are installed on different surfaces.

11. The portable communication apparatus of claim 7, wherein the first antenna radiator is directly coupled to the first feeding point.

12. The portable communication apparatus of claim 7, wherein the second antenna radiator is directly coupled to the second feeding point.

13. A portable communication apparatus, comprising:
a first antenna radiator, for radiating a high-frequency band signal;
a second antenna radiator, for radiating a low-frequency band signal;
a first feeding point, coupled to the first antenna radiator, for processing feed-in or feed-out of the signal of the first antenna radiator;
a second feeding point, coupled to the second antenna radiator, for processing feed-in or feed-out of the signal of the second antenna radiator, the first feeding point being separate from the second feeding point; and
a matching circuit, coupled to the first and second feeding points, for impedance matching with the first antenna radiator and the second antenna radiator respectively;
at least one third antenna radiator, for radiating at least one specific band signal, a band of the specific band signal being located between a ban of the high-frequency band signal and a band of the low-frequency band signal; and
a third feeding point, coupled to the third antenna radiator, for processing feed-in or feed-out of a signal of the third antenna radiator;
wherein the matching circuit is coupled to the first feeding point, the second feeding point, and the third feeding point, for matching with an impedance of the first antenna radiator, an impedance of the second antenna radiator, and an impedance of the third antenna radiator, respectively.

14. The portable communication apparatus of claim 13, wherein the first antenna radiator does not physically touch the second antenna radiator.

15. The portable communication apparatus of claim 13, wherein the first antenna radiator and the second antenna radiator are installed on a same surface.

16. The portable communication apparatus of claim 13, wherein the first antenna radiator and the second antenna radiator are installed on different surfaces.

17. The portable communication apparatus of claim 13, wherein the first antenna radiator is directly coupled to the first feeding point.

18. The portable communication apparatus of claim 13, wherein the second antenna radiator is directly coupled to the second feeding point.

* * * * *